United States Patent
Lee et al.

(10) Patent No.: US 7,139,588 B2
(45) Date of Patent: Nov. 21, 2006

(54) METHOD OF SWITCHING COMMUNICATION MODE TO VOICE COMMUNICATION IN RESPONSE TO VOICE COMMUNICATION REQUEST DURING DATA COMMUNICATION IN MOBILE STATION AND SYSTEM FOR MANAGING SERVICE USING THE SAME

(75) Inventors: Byeong-sool Lee, Anyang-si (KR); Hyung-ik Park, Seoul (KR)

(73) Assignee: Curitel Communications, Inc., Seoul (KR)

( * ) Notice: Subject to any disclaimer, the term of this patent is extended or adjusted under 35 U.S.C. 154(b) by 99 days.

(21) Appl. No.: 10/963,809

(22) Filed: Oct. 14, 2004

(65) Prior Publication Data

US 2005/0085250 A1    Apr. 21, 2005

(30) Foreign Application Priority Data

Oct. 15, 2003   (KR) ..................... 10-2003-0071924

(51) Int. Cl.
*H04M 1/00* (2006.01)
*H04Q 7/20* (2006.01)
*H04B 7/00* (2006.01)

(52) U.S. Cl. .............................. 455/552.1; 455/414.1; 455/511; 455/445; 455/560; 379/93.01; 370/351

(58) Field of Classification Search ............. 455/412.1, 455/412.2, 413, 414.1, 466, 560, 509, 511, 455/552.1, 553.1, 432.1–434, 445, 417; 379/242–277, 379/352–354, 210, 211, 215.01, 67, 212.01, 379/88, 93.01; 370/216–220, 351–360, 400, 370/238, 329
See application file for complete search history.

(56) References Cited

U.S. PATENT DOCUMENTS

| | | | | |
|---|---|---|---|---|
| 5,473,671 | A | * | 12/1995 | Partridge, III .............. 455/445 |
| 2002/0111167 | A1 | * | 8/2002 | Nguyen et al. ............. 455/435 |
| 2004/0092252 | A1 | * | 5/2004 | Gustavsson et al. ...... 455/412.2 |

FOREIGN PATENT DOCUMENTS

KR    2002-0029822    4/2002

* cited by examiner

*Primary Examiner*—Lester Kincaid
*Assistant Examiner*—Emem Ekong
(74) *Attorney, Agent, or Firm*—Oblon, Spivak, McClelland, Maier & Neustadt, P.C.

(57) ABSTRACT

Disclosed herein are a method of switching a communication mode to voice communication in response to a voice communication request during data communication in a mobile station and a system for managing a service using the same. According to the method and service management system of the present invention, it is possible for a user to make voice communication when the data communication is operating, by notifying a called party in data communication through a short message service (SMS) that a voice communication request is received, switching the data communication in progress to an idle state according to the called party's response to the voice communication request so that the voice communication can be made, and resuming the data communication interrupted during the idle state after the voice communication is terminated.

10 Claims, 3 Drawing Sheets

METHOD OF SWITCHING COMMUNICATION MODE TO VOICE COMMUNICATION IN RESPONSE TO VOICE COMMUNICATION REQUEST DURING DATA COMMUNICATION IN MOBILE STATION AND SYSTEM FOR MANAGING SERVICE USING THE SAME

BACKGROUND OF THE INVENTION

1. Field of the Invention

The present invention relates to a method of switching a communication mode to voice communication in response to a voice communication request during data communication in a mobile station and a system for managing a service using the same and, more particularly, to a technology capable of simultaneously providing both voice and data services by making voice communication when data communication is operating.

2. Description of the Related Art

FIG. 1 is a schematic diagram showing a typical mobile communication system.

A mobile station (MS) 110 is a portable device which acts as a normal telephone whilst being able to move over a wide area. The MS 110 does not only support voice calls; it can also send and receive data and faxes, send short messages, access wireless application protocol (WAP) services, and provide full Internet access.

A base station (BS) 120 is a low-power multi-channel two-way radio station which is in a fixed location and is typically used by the MS 110.

A mobile switching center (MSC) 130 serving as a network node in a wireless telecommunications network is effectively a sophisticated telephone exchange which provides circuit switched services to mobile stations in a certain geographical area. Tasks of the MSC 130 include delivering calls to subscribers as they arrive based on information from a visitors location register (VLR), connecting outgoing calls to other mobile subscribers, and carrying out handovers from one MSC to another without interrupting the call.

A mobile carrier (MC) 140 provides mobile communications services via SS7 (Signaling System 7), a set of protocols defined by ITU-T (Telecommunication Standardization Sector of the International Telecommunications Union) used to set up telephone calls. For establishing a mobile communications network, the MC 140 is coupled to a variety of systems as follows: a home location register (HLR), a short message service center (SMSC), a voice mail system (VMS), a billing system, etc. The primary functions of the HLR are to send subscriber data to a VLR where a subscriber has just arrived, to pass on the roaming number requested from the subscriber's VLR to the Gateway MSC or SMSC in order to allow incoming SMSs or text messages, and to remove subscriber data from the old VLR where a subscriber has moved from. The SMSC supports the sending of text messages displayed on a liquid crystal display (LCD) provided in the MS. The VMS allows subscribers to receive a voice message through a speaker provided in the MS. The billing system performs the process of sending accounts to subscribers for voice and data communications services.

An Interworking Function (IWF) 150 is used to enable data communications between an SS7-based mobile communication network and a Transmission Control Protocol/Internet Protocol (TCP/IP)-based Internet network. During data communications, the IWF 150 exchanges subscriber information, accounts, etc. with the MSC, the HLR, the billing system, etc.

A gateway (G/W) 160 is a network node equipped for interfacing with another network that uses different protocols. The G/W 160 connects the SS7-based mobile communication network with the TCP/IP-based Internet network by performing the required protocol conversions.

A Content Management System (CMS) 170, a system used to organize and facilitate collaborative content creation, manages the content of web sites to be transmitted to the MS. The CMS 170 is also responsible for registering the authority of content providers (CPs), and managing the CPs.

Under the control of the CMS 170, a Domain Name System (DNS) 180 provides an IP address associated with a domain name of each site providing content in response to a content transmission request from the MS.

At least one CP 190 connected to the CMS 170 transmits to the MS multimedia contents such as graphic images, animations, and melodies in response to a request from the MS.

Operation of providing a voice communication service in a typical mobile communication system with the above-mentioned configurations is now set forth.

Once the MS 110 is powered on, a call origination signal is transmitted to the BS 120 over an access channel. The BS 120 establishes a traffic channel to transmit a channel assignment signal to the MS 110 over a paging channel. The MS 110 confirms the traffic channel establishment and transmits a traffic channel preamble to the BS 120. The BS 120 acquires a reverse traffic channel and then transmits an acknowledge signal to the MS 110 for call setup.

During the call setup phase, the MSC 130 transmits a communication request signal to a called party's mobile station MS2 through the BS 120 in response to a communication request from a calling party's mobile station MS1, and requests a response thereto from the MS2. Upon receiving the response from the MS2, the MSC 130 connects the MS1 with the MS2 for voice communication therebetween, and controls voice data frame transmission between the MS1 and the MS2 over a traffic channel.

On the other hand, operation of providing a data communication service in a typical mobile communication system with the above-mentioned configurations is now set forth.

Once a mobile communication subscriber accesses a data communication service through the MS 110, the IWF 150 requests initial access from the DNS 180. The DNS 180 transmits to the CMS 170 a mobile IP address assigned to the MS 110 and requests main menu access from the MS 110. The CMS 170 provides a main menu to the mobile IP address assigned to the MS 110. When the mobile communication subscriber selects any item in the main menu using the MS 110, the CMS 170 requests the uniform resource locator (URL) of the selected item from the DNS 180. The DNS 180 notifies the CMS 170 of the URL associated with the selected item. The CMS 170 provides a content specified by the URL to the MS 110. The mobile communication subscriber views the content through the MS 110 and requests the CMS 170 to download it to his or her mobile station. When the CMS 170 requests the URL associated with the content from the DNS 180, the DNS 180 notifies the CMS 170 of the URL associated with the content. The CMS 170 pushes the content specified by the URL to the MS110, which in turn loads the content. After the MS 110 requests the CMS 170 to move back to a higher menu level after the downloading operation, the above-mentioned process may be reiterated. Alternatively, upon receiving a request to terminate the process from the MS 110, the CMS 170 requests accounts for the communication services from the billing system.

However, there has been a problem in that the conventional mobile station cannot simultaneously provide the voice and data communications services.

That is, when a calling party makes a telephone call to a called party in data communication, the called party's mobile station MS2 cannot receive the telephone call since it is using a communication channel. At this time, a signal indicating that the MS2 is in use is transmitted to the calling party's mobile station MS1.

If the called party's mobile station MS2 is using a data communication service in the case of the calling party's voice communication request, the MSC 130 informs the calling party's mobile station MS1 of the fact that the MS2 is in use. In this case, the called party can be informed of the fact, through a message mailbox, that the voice communication request was made by the calling party.

The data communication service is typically used for a long time compared to the voice communication. The calling party will attempt to make several calls to the called party since the calling party cannot recognize whether the called party is in voice communication or data communication. Furthermore, the called party cannot be informed of the fact that someone is calling to his or her own mobile station since the called party cannot make voice communication during data communication.

On the other hand, even though a value-added service is available such as a call keeper, which is a function of notifying a called party of the fact that someone has called him or her in case the called party is busy or does not answer, the called party can be informed of the fact only after the data communication in use is terminated.

SUMMARY OF THE INVENTION

The present invention provides a method of switching a communication mode to voice communication in response to a voice communication request during data communication in a mobile station.

The present invention also provides a system for managing a service of switching a communication mode to voice communication in response to a voice communication request during data communication in a mobile station.

In accordance with an aspect of the present invention, there is provided a method of switching a communication mode to voice communication in response to a voice communication request during data communication in a mobile station (MS), comprising the steps of: (a) allowing a calling party's MS to make a call connection request by attempting to connect a call to a mobile switching center (MSC) over an access channel so that the calling party's MS can make voice communication with a called party's MS; (b) allowing the MSC to make a call connection processing request by determining a communication state of the called party's MS and requesting a mobile carrier (MC) to execute call connection processing on the basis of the communication state; and (c) allowing the MC to carry out a communication process by transmitting a voice communication request message containing a phone number of the calling party's MS to the called party's MS in data communication through a short message service (SMS) system.

The method may further comprise the steps of: (d) allowing the MC to carry out a response information reception operation by receiving a response to the voice communication request message from the called party's MS; (e) allowing the MC to make a voice communication switching request by requesting the MSC to switch a communication mode to voice communication when the response from the called party's MS is an approval of the voice communication connection; (f) allowing the MSC to carry out a data communication idle process by switching the data communication in progress to an idle state in response to the voice communication switching request from the MC and transferring a data communication termination command to the called party's MS and an interworking function (IWF); and (g) allowing the MSC to carry out a voice communication process by requesting the called party's MS to receive the voice communication over a paging channel, receiving a response thereof from the called party's MS over an access channel, and processing the voice communication between the calling party's MS and the called party's MS over a traffic channel.

The method may further comprise the steps of: (h) allowing the MSC to carry out a voice communication termination detection operation by detecting a signal indicative of the voice communication termination between the calling party's MS and the called party's MS to release the voice communication connection therebetween and transferring the voice communication termination signal to the MC; and (i) allowing the MSC to carry out a data communication resumption is operation by transmitting a data communication resumption command to the called party's MS and the IWF in response to the data communication resumption command from the MC so that the data communication interrupted during the idle state can be resumed.

The step (c) may comprise the step of processing the voice communication between the calling party's MS and the called party's MS when the called party's MS is not in a communication connection state.

The step (c) may comprise the step of notifying the calling party's MS of the fact that the called party's MS is in voice communication if the called party's MS is currently making voice communication, and performing a switching operation to a message mailbox.

The step (e) may comprise the step of requesting the MSC to continue to execute data communication in progress when the response from the called party's MS is a rejection of the voice communication connection.

The step (d) may comprise the step of allowing the MC to transmit to the calling party's MS a voice message indicating that there is no response received from the called party's MS, if there is no response to the voice communication request message transmitted at the step (c) during a waiting time.

In accordance with another aspect of the present invention, there is provided a system for managing a service of switching a communication mode to voice communication in response to a voice communication request during data communication in a mobile station (MS) interworked with a mobile carrier (MC), the system comprising: a service request information receiver for receiving, from a user, service request information associated with a value-added service based on a method of switching a communication mode to voice communication in response to a voice communication request during data communication; a service registration processor for performing a service registration procedure for the user according to the service request information received from the service request information receiver and recording service registration information on the user's membership database provided in the MC; and a service approval processor for referring to the membership database to determine whether a member corresponding to the phone number of the called party's MS has registered for the service when the called party's MS receiving the voice communication request is in data communication, and, if the member registered for the service, requesting the MC to switch the data communication operating in the called party's MS to an idle state and to process the voice communication between the called party's MS and a corresponding calling party's MS.

The service approval processor may transmit a voice communication request message to the called party's MS in data communication, receive a response to the voice communication request message from the called party's MS, and request the MC to switch the data communication in progress to an idle state and to process the voice communication between the calling party's MS and the called party's MS when the response from the called party's MS is an approval of the voice communication connection.

The service approval processor may operate so that a voice message indicating that no response is received is transmitted to the calling party's MS if no response to the voice communication request message is received from the called party's MS during a waiting time.

The voice communication request message may be transmitted in an SMS message through a short message service center (SMSC) interworked with a mobile communication carrier.

The SMS message may contain a phone number of the calling party's MS.

BRIEF DESCRIPTION OF THE DRAWINGS

The above and other features and advantages of the present invention will become more apparent by describing in detail exemplary embodiments thereof with reference to the attached drawings in which.

DESCRIPTION OF THE PREFERRED EMBODIMENTS

Exemplary embodiments in accordance with the present invention will now be described in detail with reference to the accompanying drawings.

A logical channel used in a mobile communication system in accordance with the present invention is now set forth.

The logical channel used in the mobile communication system comprises a control channel and a traffic channel. The control channel includes a pilot channel, a paging channel, a sync channel, and an access channel. The pilot channel is a forward channel used for transmission of control information from the BS to the MS and allows the MS to acquire the timing of a forward traffic channel. The pilot channel provides a phase reference for coherent demodulation and provides means for signal strength comparisons between the BSs for determining when to handoff. In addition, the pilot channel is an unmodulated, direct-sequence spread spectrum signal transmitted continuously by each BS. The paging channel is a forward channel used for transmission of control information and pages from the BS to the MS. The sync channel is a coded, interleaved and modulated spread-spectrum signal used for transporting an initial synchronization message to the MS. The access channel is a reverse channel used by the MS for communicating to the BS. The access channel is used for short signaling message exchanges, such as call originations, responses to pages, and registrations.

The traffic channel is used for transmitting user's (voice) data in addition to signaling traffic between the BS and the MS. In the blank-and-burst format, a frame of primary digital voice data is suppressed or not transmitted to make time available to send the signaling traffic. In addition, in the case of the forward link from BS to MS, a power control channel is used by MS for the power control of control and access channels.

Figure 2:
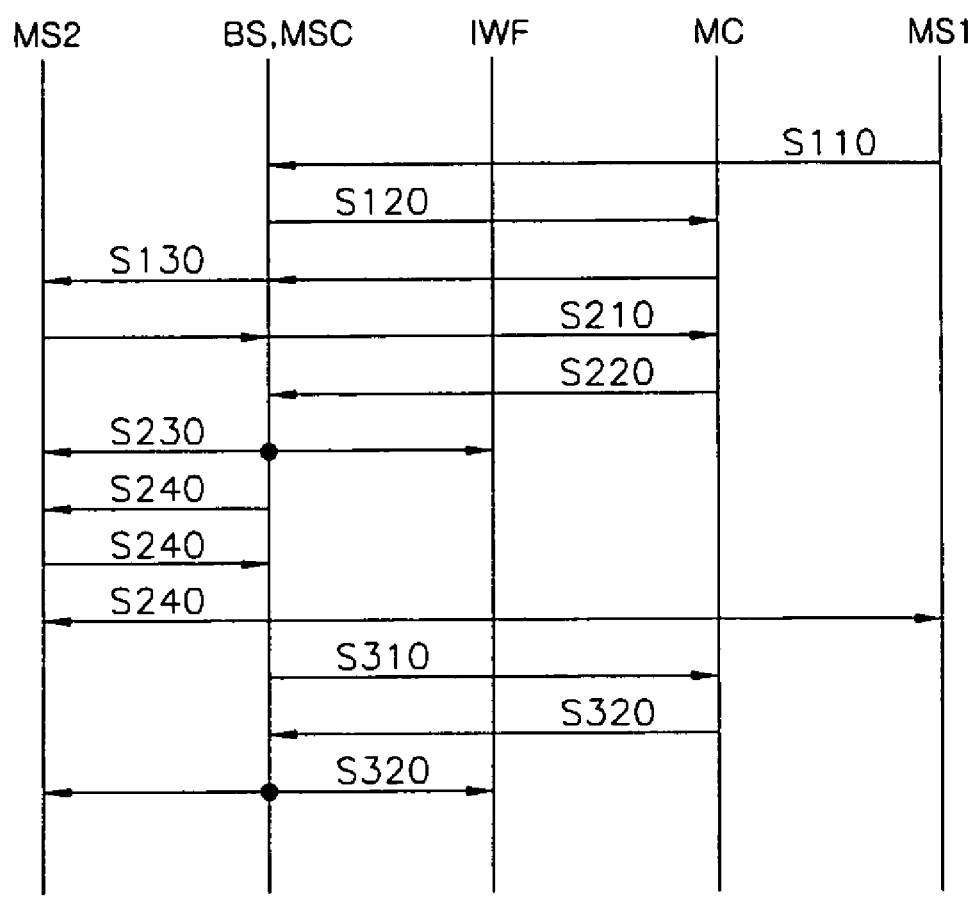
FIG. 2 is a flow chart showing a method of switching a communication mode to voice communication in response to a voice communication request during data communication in a mobile station, in accordance with an embodiment of the present invention.

FIG. 2 is a flow chart showing a method of switching a communication mode to voice communication in response to a voice communication request during data communication in a mobile station, in accordance with an embodiment of the present invention.

The method in accordance with an embodiment of the present invention comprises a call connection request step (S110), a call connection processing request step (S120), and a communication process step (S130).

In this embodiment, upon receiving a voice communication request during data communication by means of a mobile station, a subscriber is informed of the voice communication request through a short message service (SMS).

At a call connection request step S110, when the calling party's mobile station MS1 makes a telephone call to the called party's mobile station MS2, the MS1 attempts to make a call connection to the MSC over an access channel for making voice communication with the MS2.

At a call connection processing request step S120, the MSC determines a communication state of the MS2 and requests the MC to execute call connection processing on the basis of the communication state of the MS2.

At a communication process step S130, the MC executes call connection processing on the basis of the communication state of the MS2.

If the MS2 is not in use, the MC executes voice communication processing between the MS1 and the MS2. A technology relating to the above-mentioned process is well known in the art, and thus the detailed description thereof is omitted here.

If the MS2 is currently making voice communication, the MC informs the MS1 that the MS2 is making voice communication and in turn delivers the call to a message mailbox. A technology relating to the above-mentioned process is well known in the art, and thus the detailed description thereof is omitted here.

If the MS2 is currently making data communication, the MC transmits a voice communication request message, together with a phone number of the MS1, to the MS2 through an SMS system.

That is, since the SMS is available when the data communication is operating, the MC transmits the voice communication request message to the MS2 through the SMS to enable the called party to transmit a response signal indicating whether or not he or she needs the voice communication connection.

Consequently, a user can be notified of the voice communication request during the data communication process.

If no response to the voice communication request message transmitted at the communication process step S130 is made during a waiting time, the MC can be implemented so that the response to the request message can be transmitted to the MS1 in a voice message indicating that the called party has not responded.

On the other hand, the method in accordance with another embodiment of the present invention further comprises a response information reception step S210, a voice communication switching request step S220, a data communication idle process step S230, and a voice communication process step S240.

According to this embodiment, upon receiving a voice communication request during data communication in a mobile station, a process of switching data communication in progress to an idle state is carried out for making voice communication.

When a voice communication request message is transmitted to the called party's MS2, the called party makes a response to the request message. The response is in turn transmitted to the MC over a traffic channel.

At a response information reception step S210, the MC receives the response to the voice communication request message from the MS2.

At a voice communication switching request step S220, the MC requests the MSC to switch a communication mode to voice communication if the response from the MS2 is an approval of the voice communication connection. On the contrary, the MC requests the MSC to continue to execute data communication in progress if the response from the MS2 is a rejection of the voice communication connection.

At a data communication idle process step S230, in response to the voice communication switching request from the MC, the MSC switches the data communication in progress to an idle state and transfers a data communication termination command to the MS2 and the IWF.

At a voice communication process step S240, the MSC requests the MS2 to receive the voice communication over a paging channel, receives a response thereof from the MS2 over an access channel, and processes the voice communication between the MS1 and the MS2 over a traffic channel.

Consequently, in the case of a voice communication request during data communication in a mobile station, the data communication in progress can be switched to an idle state for making voice communication.

On the other hand, the method in accordance with another embodiment of the present invention further comprises a voice communication termination detection step S310 and a data communication resumption step S320.

According to this embodiment, a process of resuming the data communication interrupted during the idle state is carried out after the voice communication requested during the data communication in the MS is performed.

Once the data communication in progress is switched to the idle state and the voice communication is made, at a voice communication termination detection step S310, the MSC monitors the progress of the voice communication to detect a signal indicative of the voice communication termination between the MS1 and the MS2.

When the voice communication termination signal is detected, the MSC releases the voice communication connection between the MS1 and the MS2 and in turn transmits the voice communication termination signal to the MC.

In response to the voice communication termination signal, the MC transmits a data communication resumption command to the MSC. At a data communication resumption step S320, the MSC transmits the data communication resumption command to the MS2 and the IWF in response to the data communication resumption command from the MC so that the data communication interrupted during the idle state can be resumed.

Consequently, after the voice communication requested during the data communication in a mobile station is completed, the data communication interrupted during the idle state can be resumed.

Figure 3:
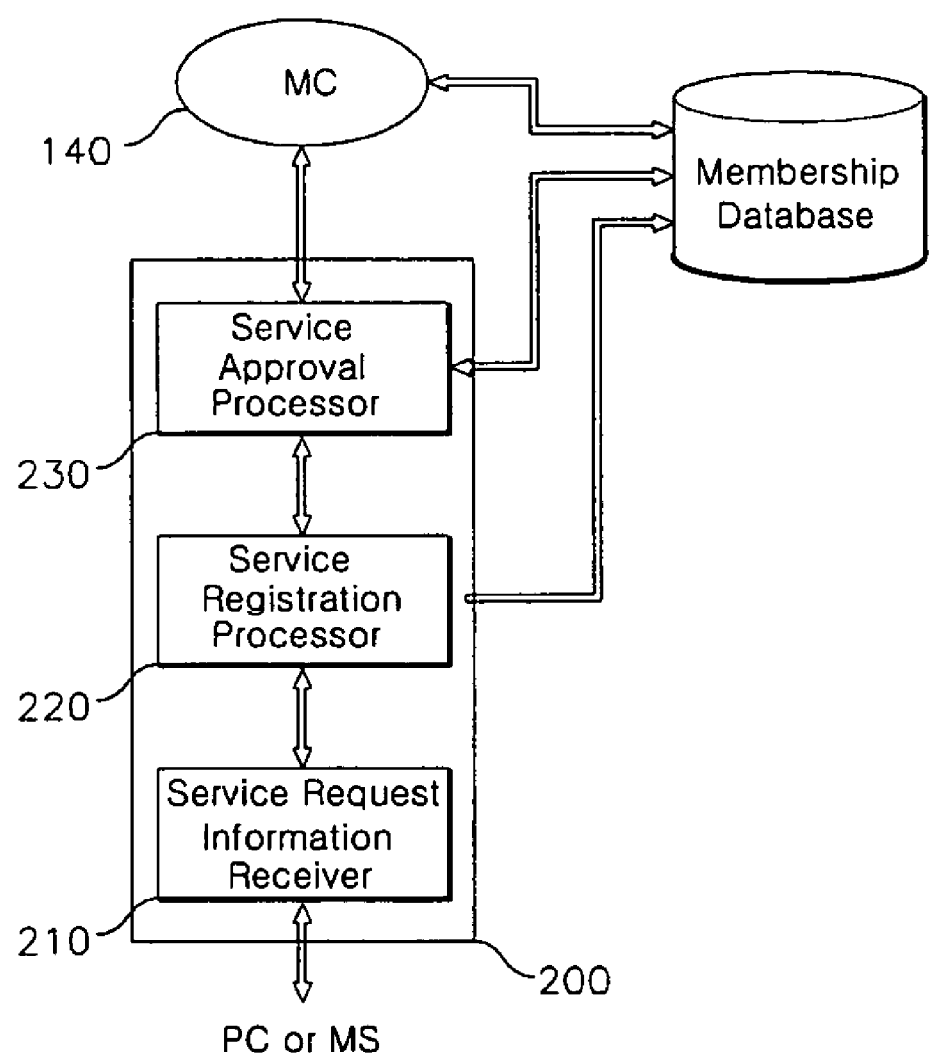
FIG. 3 is a block diagram showing a system for managing a service of switching a communication mode to voice communication in response to a voice communication request during data communication in a mobile station, in accordance with an embodiment of the present invention.

FIG. 3 is a block diagram showing a system for managing a service of switching a communication mode to voice communication in response to a voice communication request during data communication in a mobile station, in accordance with an embodiment of the present invention.

Figure 1:
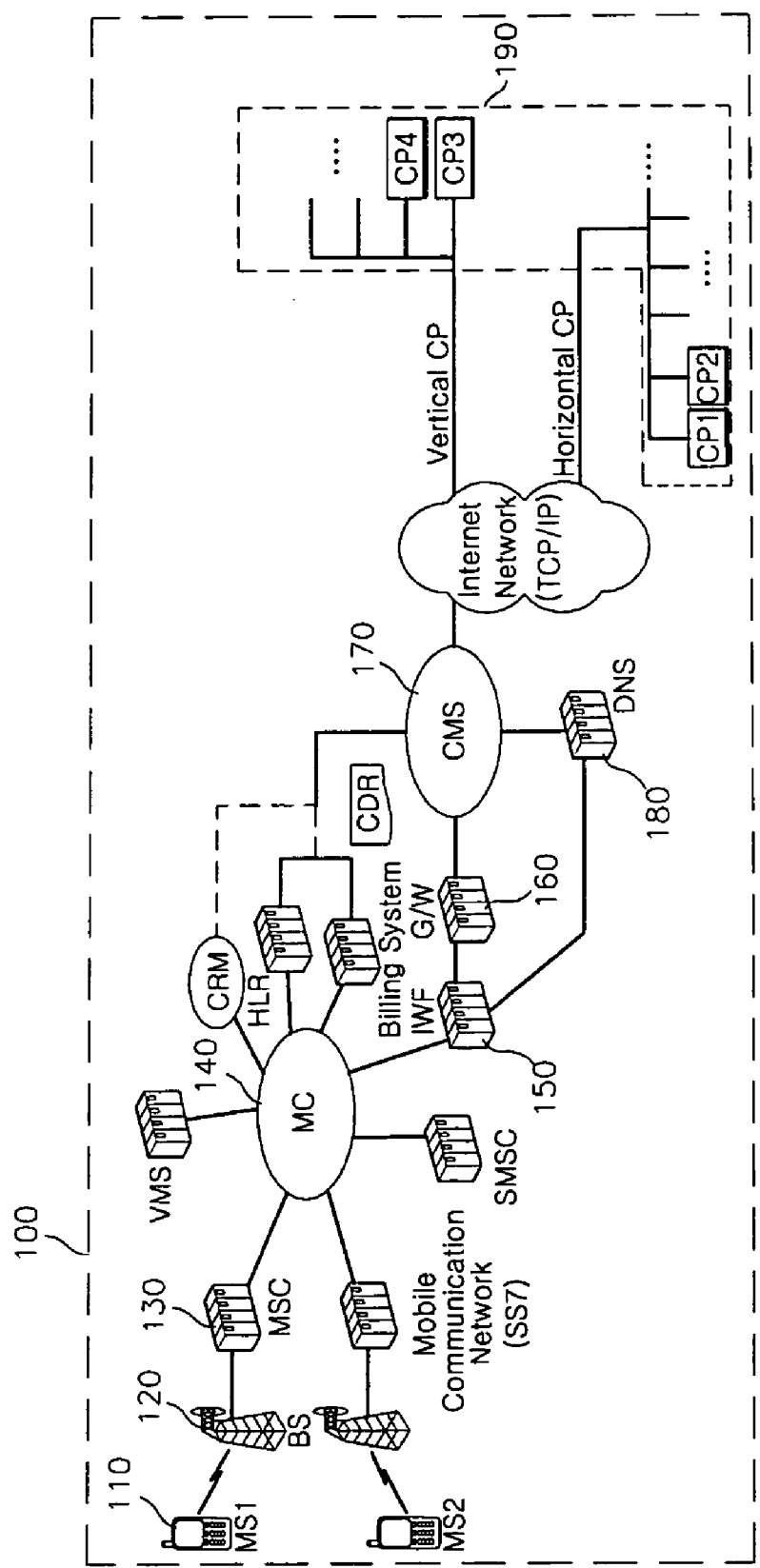
FIG. 1 is a schematic diagram showing a mobile communication system.

A service management system 200 interworked with the MC 140 shown in FIG. 1 receives a request for a service of switching a communication mode to voice communication in response to a voice communication request during data communication in a mobile station, and performs a process of giving permission to use the service.

The service management system 200 comprises a service request information receiver 210, a service registration processor 220, and a service approval processor 230.

The service request information receiver 210 receives service request information from a user desiring to use a value-added service based on the method of switching a communication mode to voice communication in response to a voice communication request during data communication in a mobile station.

The service registration processor 220 performs a service registration procedure for a user according to the service request information received from the service request information receiver 210, and records service registration information on the user's membership database provided in the MC.

When the MS2 receiving the voice communication request is in data communication, the service approval processor 230 refers to the membership database to determine whether a member corresponding to the phone number of the MS2 has registered for the service. If the member registered for the service, the service approval processor 230 requests the MC to switch the data communication operating in the MS2 to an idle state and to process the voice communication between the MS1 and the MS2.

Accordingly, the present invention can provide a value-added service by managing a service of switching a communication mode to voice communication through the service management system 200 in response to a voice communication request during data communication in a mobile station.

In accordance with an additional feature of the present invention, the service approval processor 230 transmits a voice communication request message to the MS2, and then receives a response thereof from the MS2. If a response is received indicating that a voice communication connection is permitted, the data communication in progress is switched to an idle state. Next, the service approval processor 230 requests the MC to execute voice communication between the MS1 and the MS2.

When a voice communication request message of inquiring of the MS2 in data communication whether or not to make the voice communication is transmitted to the MS2, the MS2 determines whether to make the voice communication.

In this case, it is preferable that the voice communication request message be transmitted in an SMS message through a short message service center (SMSC) interworked with the MC. Furthermore, it is preferable that the SMS message contain a phone number of the MS1.

In a case where the service approval processor 230 has not received a response to the voice communication request message during a waiting time, it can transmit, to the calling party's MS1, a voice message indicating that no response to the voice communication request message has been received.

In accordance with the present invention, it is possible for a subscriber using a mobile station to recognize a voice communication request when data communication is operating. In addition, it is possible to switch the data communication in progress to an idle state so that the voice communication can be made in response to the voice communication request during the data communication. Furthermore, it is possible to resume the data communication interrupted during the idle state after the voice communication requested during the data communication is terminated.

While the present invention has been described with reference to exemplary embodiments thereof, it will be understood by those skilled in the art that various changes in form and details may be made therein without departing from the scope of the present invention as defined by the following claims.

What is claimed is:

1. A method of switching a communication mode to voice communication in response to a voice communication request during data communication in a mobile station (MS), comprising the steps of:
    (a) allowing a calling party's MS to make a call connection request by attempting to connect a call to a mobile switching center (MSC) over an access channel so that the calling party's MS can make voice communication with a called party's MS;
    (b) allowing the MSC to make a call connection processing request by determining a communication state of the called party's MS and requesting a mobile carrier (MC) to execute call connection processing on the basis of the communication state; and
    (c) allowing the MC to carry out a communication process by transmitting a voice communication request message containing a phone number of the calling party's MS to the called party's MS in data communication through a short message service (SMS) system.
    (d) allowing the MC to carry out a response information reception operation by receiving a response to the voice communication request message from the called party's MS;
    (e) allowing the MC to make a voice communication switching request by requesting the MSC to switch a communication mode to voice communication when the response from the called party's MS is an approval of the voice communication connection;
    (f) allowing the MSC to carry out a data communication idle process by switching the data communication in progress to an idle state in response to the voice communication switching request from the MC and transferring a data communication termination command to the called party's MS and an interworking function (IWF); and
    (g) allowing the MSC to carry out a voice communication process by requesting the called party's MS to receive the voice communication over a paging channel, receiving a response thereof from the called party's MS over an access channel, and processing the voice communication between the calling party's MS and the called party's MS over a traffic channel.

2. The method as set forth in claim 1, further comprising the steps of:
    (h) allowing the MSC to carry out a voice communication termination detection operation by detecting a signal indicative of the voice communication termination between the calling party's MS and the called party's MS to release the voice communication connection therebetween and transferring the voice communication termination signal to the MC; and
    (i) allowing the MSC to carry out a data communication resumption operation by transmitting a data communication resumption command to the called party's MS and the IWF in response to the data communication resumption command from the MC so that the data communication interrupted during the idle state can be resumed.

3. The method as set forth in claim 1, wherein the step (c) comprises the step of processing the voice communication between the calling party's MS and the called party's MS when the called party's MS is not in a communication connection state.

4. The method as set forth in claim 1, wherein the step (c) comprises the step of notifying the calling party's MS of the fact that the called party's MS is in voice communication if the called party's MS is currently making voice communication, and performing a switching operation to a message mailbox.

5. The method as set forth in claim 2, wherein the step (c) comprises the step of processing the voice communication between the calling party's MS and the called party's MS when the called party's MS is not in a communication connection state.

6. The method as set forth in claim 2, wherein the step (c) comprises the step of notifying the calling party's MS of the fact that the called party's MS is in voice communication if the called party's MS is currently making the voice communication, and performing a switching operation to a message mailbox.

7. The method as set forth in claim 1, wherein the step (e) comprises the step of requesting the MSC to continue to execute data communication in progress when the response from the called party's MS is a rejection of the voice communication connection.

8. The method as set forth in claim 2, wherein the step (e) comprises the step of requesting the MSC to continue to execute data communication in progress when the response from the called party's MS is a rejection of the voice communication connection.

9. The method as set forth in claim 1, wherein the step (d) comprises the step of allowing the MC to transmit to the calling party's MS a voice message indicating that there is no response received from the called party's MS, if there is no response to the voice communication request message transmitted at the step (c) during a waiting time.

10. The method as set forth in claim 2, wherein the step (d) comprises the step of allowing the MC to transmit to the calling party's MS a voice message indicating that there is no response received from the called party's MS, if there is no response to the voice communication request message transmitted at the step (c) during a waiting time.

* * * * *